United States Patent [19]

Buchholz et al.

[11] 4,339,660

[45] Jul. 13, 1982

[54] REFLECTION LIGHT BARRIER APPARATUS FOR RECOGNIZING BOTH STRONGLY AND WEAKLY REFLECTING OBJECTS

[75] Inventors: Karl-Otto Buchholz; Jürgen Erdmann, both of Waldkirch; Günter Fetzer, Gundelfingen, all of Fed. Rep. of Germany

[73] Assignee: Erwin Sick GmbH Optik-Elektronik, Fed. Rep. of Germany

[21] Appl. No.: 150,093

[22] Filed: May 15, 1980

[51] Int. Cl.³ ............................................. G01V 9/04
[52] U.S. Cl. .................................... 250/221; 250/225
[58] Field of Search ....................... 356/369, 364–365; 250/221, 225; 340/556, 557

[56] References Cited

U.S. PATENT DOCUMENTS

| 3,631,254 | 12/1971 | Covault | 356/367 |
| 3,715,165 | 2/1973 | Smith | 356/365 |
| 4,224,608 | 9/1980 | Lederer | 250/225 |

FOREIGN PATENT DOCUMENTS 2238049  2/1974  Fed. Rep. of Germany .
2647285  4/1978  Fed. Rep. of Germany .
1038402  8/1966  United Kingdom ................ 250/225

*Primary Examiner*—William H. Punter

[57] ABSTRACT

A light transmitter directs light via a first polarizing filter, so that it is polarized in one plane, to a retro-reflecting device across a region to be monitored and the retro-reflector produces depolarization, or rotates the plane of polarization of the light, prior to directing it to a light receiver positioned adjacent the light transmitter. A second polarizing filter crossed relative to the first is positioned in front of the light receiver so that the light receiver will only recognize light whose plane of polarization has been appropriately rotated by the retro-reflector but not light reflected from a strongly reflecting object which interrupts the light barrier. Threshold circuitry evaluates whether a signal from a photoelectric convertor embodied in the receiver lies above or below a given threshold. Weakly reflecting objects are not recognized, because light reflected therefrom will be too weak to generate a signal above the required threshold. Various polarizing arrangements are described.

4 Claims, 1 Drawing Figure

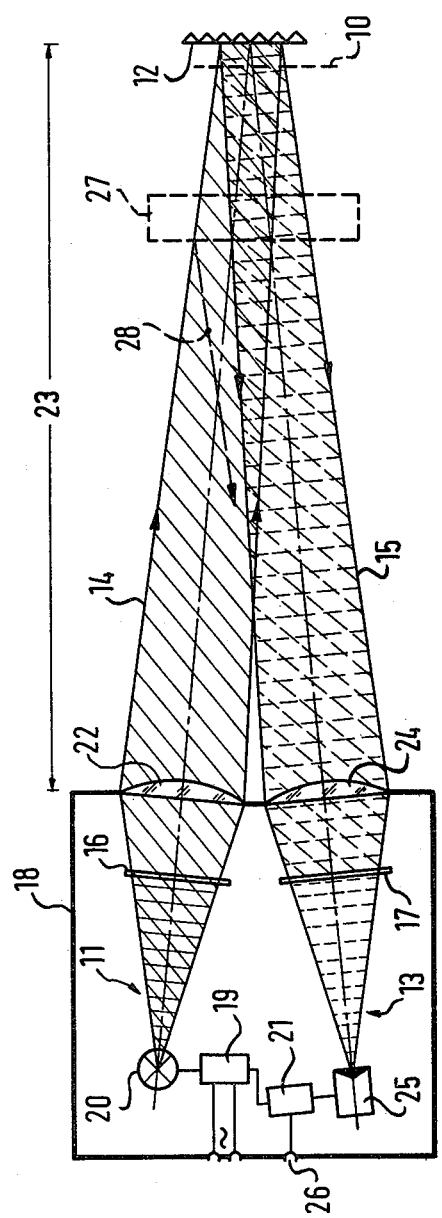

REFLECTION LIGHT BARRIER APPARATUS FOR RECOGNIZING BOTH STRONGLY AND WEAKLY REFLECTING OBJECTS

The present invention relates to reflection light barrier apparatus and has particular reference to light barrier apparatus of the reflection type in which a light transmitter and a light receiver are disposed at a first end of a region to be monitored and a retro-reflecting device is provided at a second end of said region and is adapted to return a transmitted light beam from said light transmitter to said light receiver.

In reflection light barriers of this kind the light transmitter and light receiver are conveniently, and usually, united in a single housing. The transmitted and received light beams can either be physically separated from one another and transmitted and received via respective objectives arranged directly alongside one another or can be transmitted and received through a single lens and separated within the unit by means of beam splitting mirrors or equivalent devices.

It is frequently convenient to use distinct front lenses or objectives, particularly as the customary retro-reflecting devices such as triple mirror arrangements do not reflect an incident light beam exactly back on itself, but rather reflect it within a narrowly defined solid angle, so that a relatively large fraction of the transmitted light beam from the transmitting objective will be deflected to a receiving objective arranged directly alongside the transmitting objective.

Known reflection light barrier apparatus is useful for recognizing the presence of objects or obstacles within the monitored region. The reflected light beam from the retro-reflector is directed onto a photoelectric converter associated with the light receiving unit and is converted into an electrical signal which is applied to an electronic processing unit. The electronic processing unit includes threshold circuitry and, in the simplest case, provides at its output an electrical, optical or acoustical announcement as to whether the signal lies above or below the threshold i.e. as to whether the light beam passes freely across the monitored region or whether it is interrupted by an object.

The advantages of light barrier apparatus in which the transmitter and receiver are contained in one housing reside in the facts that an electrical connection is only necessary at one point and that it is only necessary to provide a simple retro-reflector, the adjustment of which is relatively uncritical, at the opposite end of the monitored region. It is however frequently necessary to forego these advantages if it is also desired to recognize strongly reflecting objects within the monitored region. The reason for this is that the transmitted light beam is not only reflected at the reflector but also at the object to be recognized. The receiver therefore still receives light when a reflecting object enters the monitoring system so that in this case the presence of the obstacle within the monitored region does not result in a significant reduction of the light falling on the photoelectric converter and is not signalled.

As a result of this difficulty it has already been proposed in German Offenlegungsschrift No. 19 34 321 to arrange a polarizer in front of a triple reflector so that it is possible to distinguish at the receiver between light reflected from the retro-reflecting device and light reflected by shiny or bright obstacles. In order to distinguish light from the retro-reflector from reflection at bright obstacles it is however necessary, in the known reflection light barrier apparatus, to provide either two photoconverters and a logic circuit or a rotating polarizer and a circuit which distinguishes between alternating and constant light. A similar arrangement which also features a rotating polarizer is shown in GB-PS 1,038,402.

A triple reflector of the kind conventionally used for retro-reflecting devices has an inherent property of changing the condition of polarization of an incident light beam. The known device (DE OS No. 1,934,321) however not only fails to make use of this characteristic but also operates disadvantageously as a result thereof, because the quantity of light transmitted to the receiver is actually reduced as a result of this characteristic.

A number of other arrangements have also been proposed in connection with light barrier apparatus which incorporate polarizing filters for various purposes. Thus DE-OS No. 2,014,107 for example uses polarizing filters to avoid disturbing influences caused by background brightness, daylight or other disturbing influences caused by scattered radiation. The specific arrangement however also requires the use of two photoelectric converters and associated processing circuitry.

Another light barrier arrangement incorporating polarizing filters is known from DE-OS No. 1 927 131. The described arrangement does not however relate to reflection light barrier apparatus and the polarizing filters are used quite differently to produce a light beam having two components of a different nature. The light beam crosses the monitored region to the receiver where the light is tested for the presence of the predetermined relationship between the two components. The device is able to detect the presence of an obstacle by changes brought about in the afore-mentioned proportion by the presence of an obstacle within the monitored region. As the described arrangement is not a true reflection light barrier device problems with strongly reflecting obstacles simply do not arise.

Finally it is also known, in connection with fruit and vegetable sorting devices (for example from U.S. patent specification No. 3 066 797 and German Patent Application No. 26 54 520), to project a polarized light beam at the fruit or vegetables and to examine the colour content of only the diffusely scattered light from the surface of the fruit or vegetables. The specularly reflected light, which contains little or no useful colour information, is excluded by means of a second polarizing filter crossed with respect to the first polarizing filter. Such fruit and vegetable sorting devices can however clearly not be equated with reflection light barrier apparatus which is intended to carry out a quite different function.

The principal object underlying the present invention is to provide relatively simple reflection light barrier apparatus which enables the presence of both weakly and strongly reflecting objects within a monitored region to be recognized without requiring additional complexity of the photoelectric converter and the associated electronic processing circuit and without the need for relatively expensive and cumbersome rotating polarizers.

In order to accomplish this object there is provided, in accordance with the invention, reflection light barrier apparatus for recognizing both strongly reflecting and weakly reflecting objects within a region monitored by the light barrier apparatus, said apparatus comprising a light transmitter including a light source and a light receiver including a photoelectric converter, said light transmitter and said light receiver being disposed at a first end of said monitored region, a retro-reflecting device at a second end of said region and arranged to receive a transmitted light beam from said light transmitter, to return a reflected beam to said light receiver and to change the state of polarization of said transmitted light beam, a first stationary linear polarizer arranged at said first end of the monitored region in said transmitted light beam only, a second linear stationary polarizer at said first end of the monitored region, said second polarizer being crossed at substantially 90° with respect to said first polarizer and arranged in said reflected beam optically in front of said photoelectric converter and threshold circuit discriminating means associated with the output of said photoelectric converter and adapted to indicate whether the signal received from said photoelectric converter lies above a first threshold, thus indicating that said monitoring region is uninterrupted, or below said threshold, thus indicating that the monitoring region is interrupted by one of a weakly and a strongly reflecting object.

As a result of this construction the characteristics of known retro-reflecting devices with respect to their effects on the condition of polarization of the incident light are used for the first time in a positive manner to improve the performance of the apparatus. It will be appreciated that light specularly reflected from an obstacle present in the monitored region will not be transmitted by the second polarizer because its plane of polarization will be rotated at 90° to that of the second polarizer and thus that the second polarizer will prevent light from falling on the photoelectric converter. The threshold circuitry will indicate that a signal is present below the predetermined threshold and will indicate the presence of the strongly reflecting object in the monitored region. If, on the other hand, a weakly reflecting object enters the monitored region then the quantity of light incident on the second polarizer and the photoelectric converter will in any case be considerably reduced and the threshold circuitry will once more produce a signal indicative of the presence of the object in the monitoring region. Thus in very simple and elegant fashion the light barrier apparatus has been modified, by the provision of two linear crossed polarizers and by the choice of a retro-reflector, which changes or is adapted to change the state of polarization of incident light, so that it can readily recognize both weakly and strongly reflecting objects without any added complexity in the construction of the photoelectric converter and processing circuit.

The invention thus provides a significant increase in contrast between radiation coming from the reflector and radiation originating from surface reflection at the strongly reflecting object.

Other objects and aims of the invention will become clear from the following description which is made purely by way of example and with reference to the accompanying drawing the single FIGURE of which schematically illustrates reflection light barrier apparatus.

The housing 18 of the light transmitter/receiver unit includes a power supply 19 which can be directly supplied from the mains and which feeds a light source 20, in particular a gallium arsenide diode, and an electronic processing unit 21. The light radiated from the radiation source 20 is formed into a sharply defined transmitted beam 14 via a condensor system which, for the purposes of simplicity, is not shown (but is wellknown per se) and a front objective lens 22. The transmitted beam 14 passes through a monitored region 23 at the end of which there is located a retro-reflecting device 12 which reflects the transmitted light beam 14 as a reflected light beam 15 back towards the transmitter/receiver unit through a narrowly defined solid angle. In this manner a received beam of light selected from this solid angle beam reaches a further front objective lens 24 which is arranged directly alongside the front objective lens 22 of the transmitter and which concentrates the received light onto a photoelectric converter 25. The photoelectric converter 25 is connected to an electronic processing unit 21 which includes threshold circuitry as known per se and provides a recognition signal 26 at its output, indicating the presence of an object in the monitored region, if the quantity of light received by the photoelectric converter 25 is such that the output signal from the photoelectric converter falls below a predetermined threshold.

In accordance with the invention a first stationary linear polarizer 16 is arranged between the front objective lens 22 and the light source 20 which linearly polarizes the transmitted light beam 14. The plane of polarization is preferably at the location of the smallest aperture of the rays within the apparatus.

As, in accordance with the invention, the retro-reflecting device 12 is of the kind which has a significant capability for producing depolarization the received light beam 15 which reaches the front objective lens of the light receiver is at least extensively depolarized or the plane of polarization is rotated through 90° relative to the plane of polarization of the transmitted beam 14. In accordance with the invention a second stationary linear polarizer 17 is arranged between the front objective 24 and the photoelectric converter 25 which only allows the passage of light the oscillations or vibrations of which take place in a plane which is rotated through 90° relative to the plane of oscillation of the transmitted light beam 14. Thus, if the monitored region 23 is free, the part of the light beam 15 which has a plane of oscillation with a component in the direction of the transmission plane of the polarizer 17 is transmitted to the photoelectric conventer 25.

If now an object 27 illustrated in broken lines and having a shiny surface enters the transmitted light beam 14 then light 28, which is likewise only shown in broken lines, will be reflected from its surface to the light receiver 13 within the housing 18, As, however, simple mirror surfaces do not significantly depolarize incident light the light beam 28 is linearly polarized in the same plane as the light beam 14 from the light transmitter 11. This plane of oscillation is at right angles to that, which is transmitted by the polarizer 17 so that in this case no received light reaches the photoelectric converter 25 and the processing unit 25 thus signals the presence of an object in the monitored region 23.

Preferably, in accordance with the present invention, a retro-reflecting device 12 is used which inherently rotates the plane of polarization of the transmitted light by 90°. Alternatively an optical element 10 which rotates the plane of polarization of the incoming light through 45° can be placed directly in front of a retro-reflector 12 of a kind which does not affect the plane of polarization of incident light. On its first passage through the element 10 the plane of polarization of the transmitted light ray is turned through 45°. On the second passage of the light ray through the element following reflection at the retro-reflector the plane of polarization is turned through a further 45° thus making a total of 90°. The retro-reflector should in this case have characteristics which result in no rotation, or at most only trivial rotation, of the plane of polarization of light reflected from the retro-reflector and should as far as possible also not produce depolarization. In this way the best light yield is achieved at the receiver. A dome lens is suitable as the retro-reflector but should however be equipped with silicate glass lenses in order to avoid the depolarization which prevails with transparent synthetic parts. An arrangement of several dome lenses in one plane can also be considered.

Reflecting arrangements of glass triples or glass Beck-prisms are themselves able to rotate the plane of polarization of incident light so that in this case the arrangement of an optical element 10 for rotating the plane of polarization can be spared.

For achieving a depolarization effect arrangements of synthetic triple mirrors can be used which additionally bring about a certain rotation of the plane of polarization.

Synthetic parts generally show a pronounced depolarization effect on account of their internal stresses.

If the retro-reflector 12 has no, or only trivial, depolarizing characteristics then a depolarizing optical element can be arranged at the position 10; for example a plexiglass disc which is maintained in a state of pronounced internal stress.

Various crystals and foils are available for producing a rotation of the plane of polarization at the element 10. Retro-reflective foils consisting of a large number of small spherical beams tightly packed on a substrate can be manufactured both with and without depolarization effects. A good depolarization effect is shown by the retro-reflecting foils sold under the "Scotchlite" trademarks and having the designation "diamond-grade".

The polarizing filters 16 and 17 are shown in the drawing arranged behind the front lenses 22, 24 as non-depolarizing silicate glass is used for the lenses. The polarizer 16 should however be arranged in front of the front lens 22 if this is made of synthetic material as synthetic lenses frequently work in a depolarizing manner on account of their internal stresses. The polarizer 17 should likewise also be arranged in front of the lens 24 if the latter is made of a transparent synthetic material.

The dome lenses referred to earlier in this application are well known in the art as retro-reflectors and can be used either singly or in the form of a screen of lenses. Dome lenses are for example shown in DE-AS No. 25 18 828.

It will be understood that the first and second polarizers should have respective planes of polarization which are crossed at 90° for maximum efficiency. Other angles close to 90° can however be chosen without significant loss of efficiency.

When using a retro-reflecting device with an inherent capability to produce a change of the state of polarization of an incident light beam it is preferable to choose a device which effects a 90° rotation of the plane of polarization. This angle can however lie in the range from 80° to 100° without significant disadvantage. In extreme cases, and presupposing suitable processing circuitry, the angle can lie in range 10° to 170°.

It will be appreciated by those skilled in the art that further modifications may be made to the apparatus herein disclosed without departing from the scope of the present teaching.

We claim:

1. Reflection light barrier apparatus for recognizing both strongly reflecting and weakly reflecting objects within a region monitored by the light barrier apparatus said apparatus comprising a light transmitter including a light source and a light receiver including a photoelectric converter, said light transmitter and said light receiver being disposed at a first end of said monitored region, a retro-reflecting device at a second end of said region and arranged to receive a transmitted light beam from said light transmitter and to return a reflected beam to said light receiver, a first stationary linear polarizer arranged at said first end of the monitored region in said transmitted light beam only, a second linear stationary polarizer at said first end of the monitored region, said second polarizer being crossed at substantially 90° with respect to said first polarizer and arranged in said reflected beam optically in front of said photoelectric converter and threshold circuit discriminating means associated with the output of said photoelectric converter and adapted to indicate whether the signal received from said photoelectric converter lies above a first threshold, thus indicating that said monitoring region is uninterrupted, or below said threshold, thus indicating that the monitoring region is interrupted by one of a weakly and a strongly reflecting object and wherein said retro-reflecting device is adapted to produce depolarization of said transmitted light beam.

2. Reflection light barrier apparatus in accordance with claim 1 and wherein said retro-reflecting device is of a kind inherently capable of producing depolarization without auxiliary means.

3. Reflection light barrier apparatus in accordance with claim 2 and wherein said retro-reflecting device comprises a synthetic triple mirror.

4. Reflection light barrier apparatus in accordance with claim 2 and wherein said retro-reflecting device comprises a depolarizing reflecting foil.

* * * * *